United States Patent [19]

Larson et al.

[11] Patent Number: 5,572,947
[45] Date of Patent: Nov. 12, 1996

[54] MILKING INFLATION

[75] Inventors: Leigh R. Larson, Johnson Creek; Reed A. Larson, Watertown, both of Wis.

[73] Assignee: Hi-Life Rubber Inc., Johnson Creek, Wis.

[21] Appl. No.: 412,517

[22] Filed: Mar. 29, 1995

[51] Int. Cl.$^6$ ...................................................... A01J 5/06
[52] U.S. Cl. ........................................................ 119/14.51
[58] Field of Search ............................ 119/14.47, 14.48, 119/14.49, 14.5, 14.51, 14.52, 14.53

[56] References Cited

U.S. PATENT DOCUMENTS

| | | | |
|---|---|---|---|
| 2,164,706 | 7/1939 | Flint et al. | 119/14.49 |
| 2,219,945 | 10/1940 | Scott | 119/14.49 X |
| 2,774,496 | 5/1956 | Röben | 119/14.47 |
| 4,745,881 | 5/1988 | Larson | 119/14.51 |
| 4,756,275 | 7/1988 | Larson | 119/14.49 |
| 5,215,036 | 6/1993 | Petterson et al. | 119/14.47 |

*Primary Examiner*—Robert P. Swiatek
*Attorney, Agent, or Firm*—Michael, Best & Friedrich

[57] ABSTRACT

The milking tube section of a milking inflation has an elongated stem portion including a pair of circumferentially extending, axially spaced grooves in the outer surface near the lower end of the teat cup shell. A first groove is located adjacent a thicker part or externally supported part of the stem section and is arranged to permit substantial angular bending of the teat cup assembly relative to the stem portion for attachment to a cow's teat without substantial crimping which causes a reduction in the internal cross-section area of the flow passage extending through the milking tube. The second groove cooperates with the first groove to share deflective stresses applied on the teat cup assembly when bent at an angle for installation on a cow's teat. The second groove is spaced far enough away from the first groove to permit the teat cup assembly to be folded toward the stem portion to a folded over position where the stem portion is sufficiently kinked in the vicinity of the second groove to cause opposed portions of the inner wall of the milking tube section to crimp together and shut off flow through the flow passage and the teat cup assembly can be laid across the top of a milker claw in generally horizontal orientation.

10 Claims, 2 Drawing Sheets

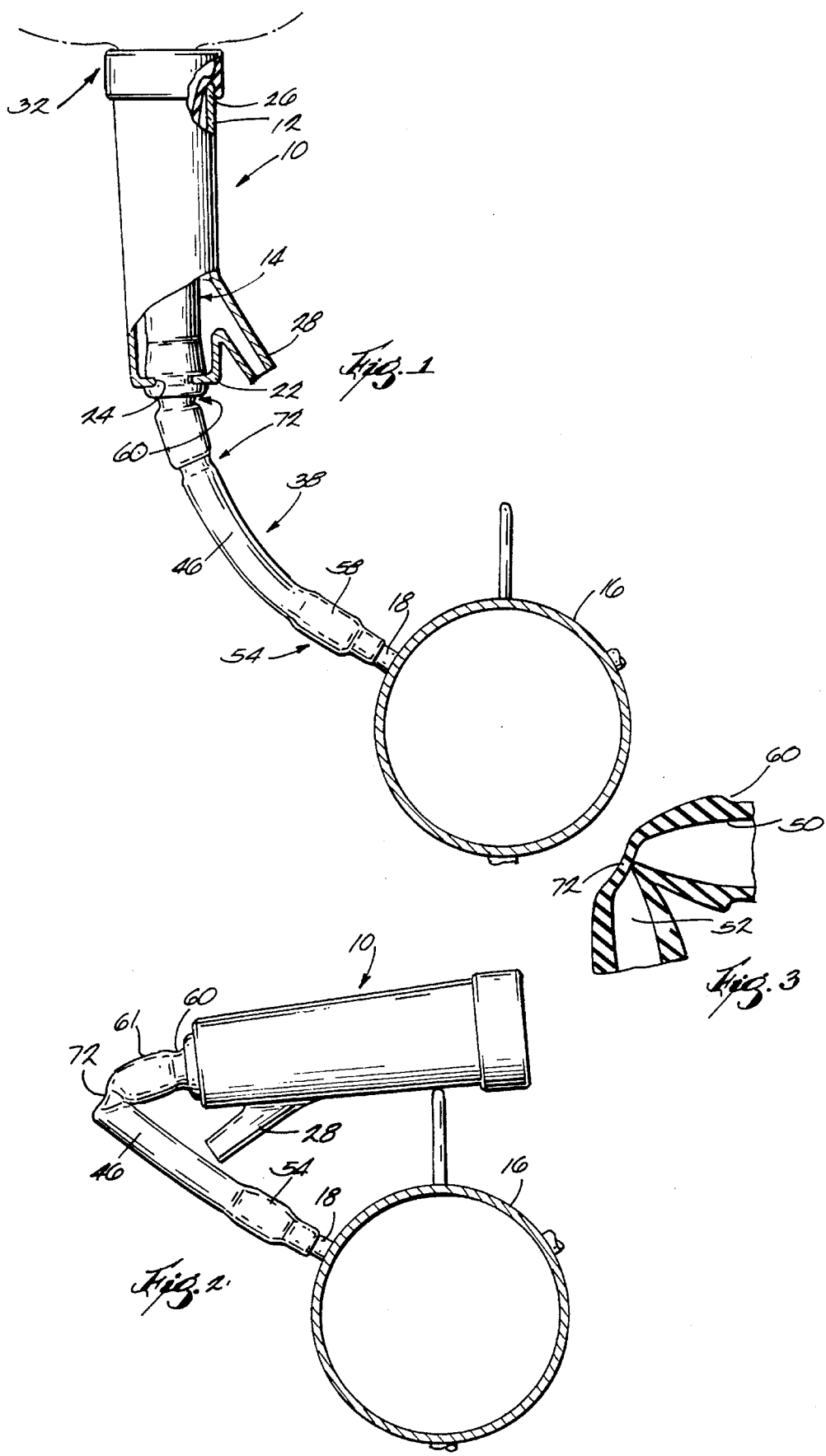

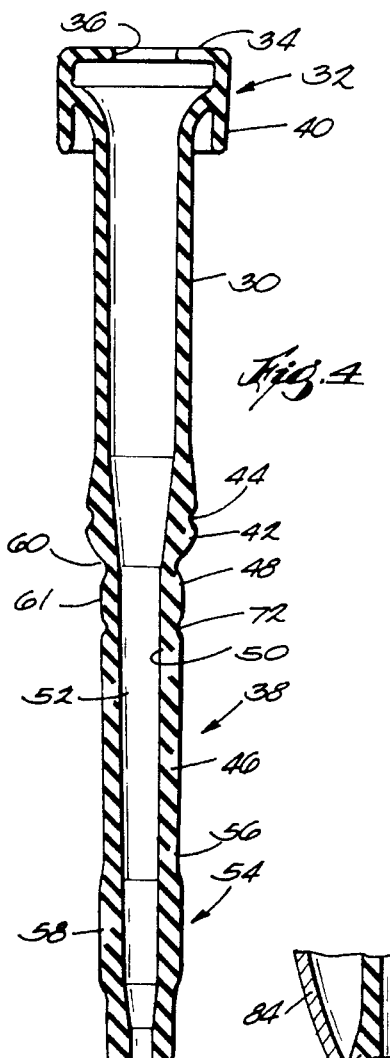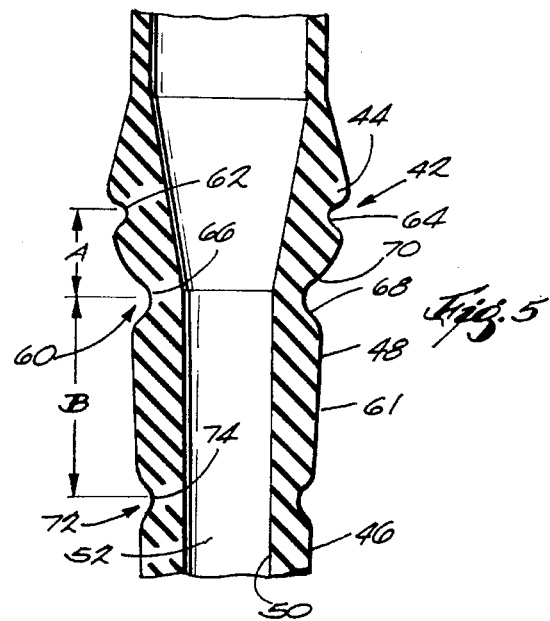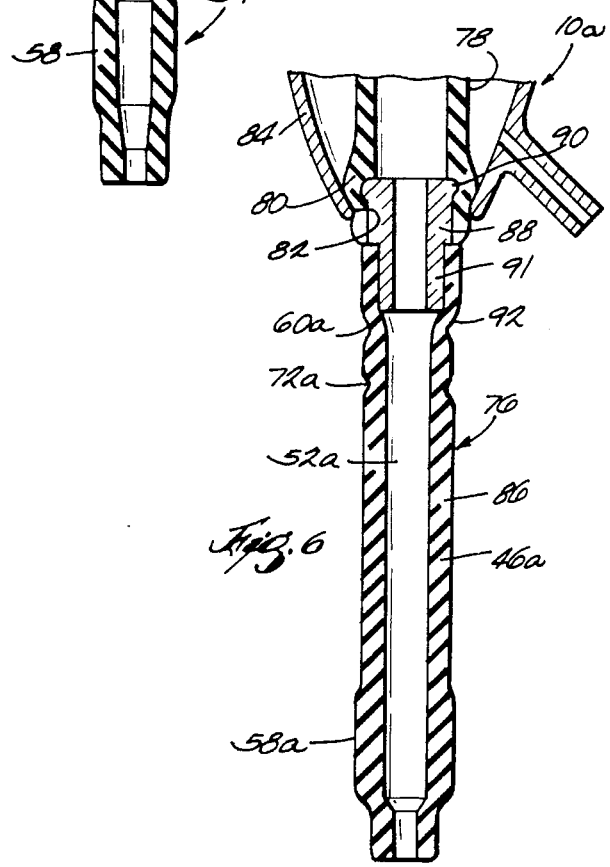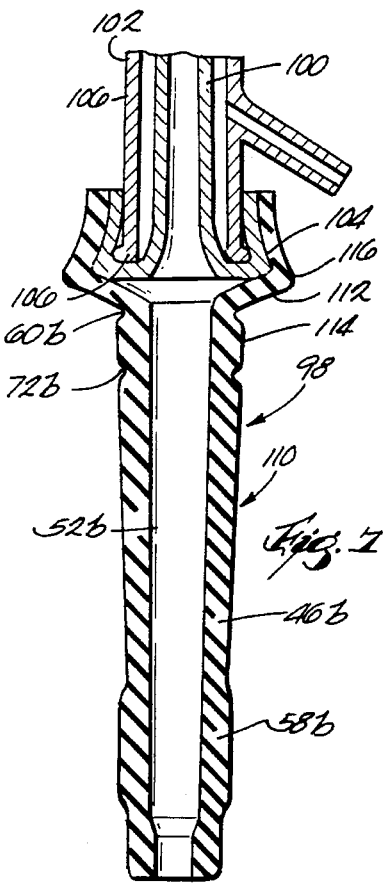

MILKING INFLATION

BACKGROUND OF THE INVENTION

This invention relates to liners or inflations for teat cup assemblies of vacuum-operated milking machines and, more particularly, to such liners or inflations including a milking tube section which extends from the teat cup shell and is attached to the nipple of the milking machine claw.

Automatic milking machines employ teat cup assemblies including a hollow, rigid outer shell which is attached to a pulsating vacuum line and a resilient, tubular liner or inflation installed in the shell in a manner to form a seal at both ends of the shell. A cow's teat is inserted into the upper end of the inflation and the lower end is connected to a claw nipple of the milking machine. During the milking operation, the teat cup assembly is suspended from a cow's teat, primarily by engagement between an opening or mouth in the upper or head end of the inflation and the cow's teat, and milk flows through the inflation under the influence of a vacuum maintained in the milking machine claw.

In the past, the inside diameter of the flow passage through the milking tube section could be relatively small because milk flow was quite low. The milking tube section was quite flexible because the small inside diameter permitted the walls to be made relatively thin yet still not collapse when subjected to a vacuum during the milking operation. This flexibility permitted the teat cup assembly to be conveniently lifted up and slipped onto a cow's teat without imparting a significant side force on the teat.

Modern dairy cows produce milk at substantially higher flows and, consequently, it has become necessary to increase the inside diameter of the flow passage through the milking tube section in order to accommodate this increase in milk flow. As the inside diameter of the milking teat is increased, the wall thickness also must be increased to prevent the walls from collapsing during the milking operation. The increased wall thickness makes the milking tube section relatively stiff.

This stiffness resists movement of the teat cup assembly into a proper orientation for attachment to a cow's teat and can cause the mouthpiece of the inflation to engage a cow's teat at an angle and/or to exert a side force on the teat. This can cause discomfort for the cow. More importantly, such a side force can cause the opening to become slightly distorted, resulting in a non-uniform seal around the teat and undesirable admission of air through the mouthpiece which can cause slippage and produce unhealthy conditions for the teat.

The spacing between teats on a cow's udder can vary considerably from one cow to another in the same herd. Bending for narrowly spaced teats can require minimal bending. Installing inflations on cows with wider spaced teats can require bending of the milking tube up to approximately 90° in some cases, particularly when a cow's udder is lower than normal. Thus, the milking tube must be designed to accommodate the bending required, in both the vertical and horizontal directions, for a wide range of teat spacings and udder heights.

A herd of typical size usually has one or more cows with a missing teat or a malformed, diseased or damaged teat which cannot be milked, or a teat which milks faster than the other teats. When one of these conditions exists and the milking system is operating, one or more teat cup assemblies may not be attached to a teat. The flow passage of the milking tube of the unused teat cup assembly should be closed in some manner to shut off communication between the milking machine claw and the inflation to preserve a vacuum in the system. Typically, the outer end of the claw nipple is beveled and the lower end of an inflation is arranged so that, when a teat cup is disengaged from the teat and the inflation becomes suspended from a claw nipple, the inner wall of the inflation sealingly engages the beveled end of the claw nipple or the walls crimp together at a location beyond the claw nipple.

A more assured and controllable way for shutting off vacuum to an unused teat cup assembly would be to fold the teat cup assembly back over the milking tube section far enough to crimp the flow passage shut and lay the teat cup assembly across the top of the milking machine claw. This could be accomplished relatively easily with inflations having thin walled milking tubes. However, conventional inflations for higher milk flow are not arranged to permit the teat cup assembly to be folded over far enough to crimp the flow passage shut and remain in such a position.

U.S. Larson Patent Nos. 4,745,881 ("'881 Patent") and 4,756,275 ("'275 Patent"), both assigned to the assignee of this application, disclose thick-walled inflations designed to permit the teat cup assembly to be bent at an angle relative to the milking tube section for installation on a cow's teat for milking and yet prevent kinking which causes a reduction in the internal cross-sectional area of the milk flow passage. The '275 Patent discloses the use of a circumferentially extending groove adjacent the lower end of the teat cup shell for this purpose. While such an arrangement is quite satisfactory from the standpoint of minimizing kinking of the milking tube when an inflation is installed on a cow's teat, this groove does not permit the teat and assembly to be folded over toward the milking tube and lie across a milking machine claw because the teat cup shell wedges against the milking tube. The '881 Patent discloses the use of a plurality (up to 7) of circumferentially extending grooves arranged to define segments which abut to prevent bending which can cause kinking during installation of an inflation on a cow's teat. Like the inflation disclosed in the '275 Patent, the inflation disclosed in the '881 Patent is satisfactory from the standpoint of resisting kinking when installed on a cow's teat for milking. However, it is so flexible that the teat cup assembly cannot be folded over the milking tube without sufficient kinking to close off the flow passage through the milking tube.

SUMMARY OF THE INVENTION

An object of the inflation is to provide a milking inflation having a milking tube section which can accommodate the higher milk flow of modern dairy cows and is arranged so that, when an inflation is not being used, the teat cup assembly can be folded over toward the milking tube section to a generally horizontal position and lie flat on a support surface such as a milking machine claw.

Another object of the invention is to provide such a milking inflation which is arranged so that the milk flow passage through the milking tube is crimped shut when the teat cup assembly is folded over as described in the preceding paragraph.

Other objects, aspects and advantages of the invention will become apparent to those skilled in the art upon reviewing the following detailed description, the drawing and the appended claims.

The milking inflation provided by the invention is made from an elastomeric material, such as a rubber composition, is adapted for installation on a teat cup shell and has an elongated milking tube section extending from the lower end of the shell. The milking tube section includes an elongated stem portion having an inner wall defining a flow passage extending therethrough. A pair of circumferentially extending, axially spaced grooves are provided in the outer surface of the stem portion near the lower end of the teat cup shell. A first groove is located adjacent a thicker part or internally supported part of the stem portion and is arranged to permit substantial angular bending of the teat cup assembly relative to the stem portion for attachment to a cow's teat without substantial crimping which causes a reduction in the internal cross-sectional area of the flow passage. The second groove cooperates with the first groove to share the deflection stresses applied by the stem portion on the teat cup assembly while attached to a cow's teat. The second groove is located far enough away from the first groove to permit the teat cup assembly to be folded over toward the stem portion to a folded over position where the stem portion is sufficiently kinked in the vicinity of the second groove to crimp the flow passage substantially closed and where the teat cup assembly can be laid on a generally horizontal support surface and remain in a folded over position.

BRIEF DESCRIPTION OF THE DRAWINGS

FIG. 1 is a partially sectioned, side elevational view of a teat cup assembly carrying a milking inflation of the invention, shown with the mouthpiece attached to a cow's teat and the milking tube section connected to the nipple of a milker claw.

FIG. 2 is a side elevational view of the teat cup assembly and milking inflation illustrated in FIG. 1 when not attached to a cow's teat with the teat cup assembly folded over and lying across the top of the milker claw.

FIG. 3 is an enlarged, fragmentary, sectional view taken in the vicinity of the second groove showing the flow passage crimped shut when the teat cup assembly is in a folded over position illustrated in FIG. 2.

FIG. 4 is an enlarged, cross-sectional, side elevational view of the milking inflation shown in FIGS. 1–3.

FIG. 5 is an enlarged, fragmentary, sectional view of the milking inflation illustrated in FIGS. 1–4 in the vicinity of the lower end of the barrel section and the upper end of the milking tube section.

FIG. 6 is a sectional, side elevational view of an alternate type milking inflation incorporating the invention.

FIG. 7 is a sectional, side elevational view of another alternate type milking inflation incorporating the invention.

DESCRIPTION OF THE PREFERRED EMBODIMENTS

Illustrated in FIG. 1 is a teat cup assembly 10 including a rigid, generally cylindrical outer shell 12 which surrounds or supports a liner or inflation 14 of the invention connected to a milker claw 16 (show fragmentarily). The milker claw 16 is connected to a suitable vacuum system (not shown) in the usual manner and includes a plurality of nipples 18 (one shown) which project upwardly and outwardly.

The shell 12 is formed from a metal, such as stainless steel, or another suitable rigid material, such as a synthetic thermoplastic or thermosetting resin. The shell 12 has a lower end 22 including an opening 24 of reduced diameter and an upper end terminating in a rim 26. Located at one side of the shell 12 is a nipple 28 which is connected, via suitable tubing (not shown), in communication with a pulsator which alternately opens to atmospheric pressure and then evacuates the chamber between the interior wall of the shell 12 and the inflation 14 to alternately contract and expand the inflation for milking.

The inflation 14 is a tubular member formed from a flexible or elastomeric material, preferably a synthetic or natural rubber composition including curing agents or the like. In the construction illustrated in FIGS. 1–5, the inflation 14 is a one-piece unit and includes an elongated, generally cylindrical suction sleeve or barrel section 30 which fits inside the shell 12, a head section 32 which fits over the shell rim 26 and has a mouthpiece 34 including a generally circular opening 36 for receiving a cow's teat and a generally cylindrical, reduced diameter milking tube section 38 which extends from the shell 12.

The head end section 32 has a peripheral, downwardly extending cuff 40 which surrounds and fits snugly over the upper end of the shell 12 and sealingly engages the shell rim 26. The milking tube section 38 includes an externally enlarged or thicker-wall shell end or retaining portion 42 which is squeezed through the opening 24 in the shell lower end 22 by pulling on the milking tube section 38 after the cuff 40 is fitted into place over the shell rim 26. The retaining portion 42 has a flange 44 which surrounds the shell opening 24 and is retained in sealing engagement with the shell 12 after the milking tube section 38 is released.

As best shown in FIG. 4, the milking tube section 38 also includes an elongated stem portion 46 having an upper end 48 connected to the retaining portion 42. The stem portion 46 includes a substantially crevice-free inner wall 50 defining a flow passage 52 extending therethrough. The inner wall 52 should be smooth or at least substantially crevice-free in order to facilitate cleaning between milking operations. If the inner wall 50 has corrugations or similar crevices, it is difficult to remove all the residual milk and know that it has been removed. Also, a smooth flow of milk through the milking tube is desirable and corrugation or similar crevices can cause turbulent flow.

The milking section 38 further includes a claw end portion 54 which extends from the lower end 56 of the stem portion 46 and is adapted to be slipped onto a claw nipple 18. The claw end portion 54 preferably includes an externally enlarged reinforcement section 58 located in region near the outer end of the claw nipple 18 and having a wall thickness somewhat greater than the wall thickness of the stem portion 46.

When the teat cup assembly 10 is in the position illustrated in FIG. 1 with a cow's teat fitted through the mouthpiece opening 36, milk flows through the inflation 14, through the claw nipple 18 and into the claw 16. The inside diameter of the stem portion 46 typically is in the order of about 7/16 to 1/2 inch and the wall thickness typically is in the order of about 3/16 to about 13/64 inch. The stem portions of conventional thick-walled inflations, other than the type disclosed in the '881 and '275 Patents identified above, can be relatively stiff and ordinarily resist bending when the teat cup assembly is lifted upwardly for attachment to a cow's teat. Consequently, the mouthpiece can engage the cow's teat at an angle and/or exert a side force on the teat with the attendant problems discussed above.

This undesirable condition is minimized by providing a first circumferentially-extending groove 60 in the exterior wall 61 of the stem portion 46 at a location near the lower end 22 of the shell 12. The first groove 60 is arranged to permit relative bending between the stem portion 46 and the retaining portion 42 without substantial crimping which causes a reduction in the internal cross-sectional area of the flow passage 52. The first groove 60 preferably is located adjacent a relatively thick or stiff portion or adjacent an internal support and has a generally tapered side wall 68 which cooperates with curved side wall 70 of the retainer portion 42 to provide a clearance space for the teat cup assembly 10 to be bent relative to the stem portion 46 as illustrated in FIG. 1 without substantial kinking.

In the embodiment illustrated in FIGS. 1–5, the first groove 60 is located at the juncture between the stem portion 46 and the enlarged retaining portion 42. The outer wall thickness of the retaining portion 42 provides resistance for minimizing kinking when there is a relative bending between the stem portion 46 and the teat cup assembly 10.

As a guide, the longitudinal distance between the bottommost portion 62 of a groove 64 which receives the lower end 22 of the shell 12 and bottommost portion 66 of the first groove 60 (designated by the letter A in FIG. 5) can be about 7/16 to about 9/16 inch. The wall thickness of the stem portion 46 at the bottommost portion 66 of the first groove 60 can be about 50% to about 65% of the wall thickness of the stem portion 46 adjacent the first groove 60. The curved side wall 70 of the retainer portion 42 and the tapered side wall 68 of the first groove 60 permit substantial relative bending, (e.g., up to about 50°) between the stem portion 46 and the retaining portion 42 at the bottommost portion 62 of the first groove 60 before those side walls touch.

The first groove 60 affords easy relative bending between the upper end of the stem portion 46 and the retaining portion 42. This permits the teat cup assembly 10 to be bent at an angle relative to the milking tube section 38, so that the inflation 14 can be installed on a cow's teat as illustrated in FIG. 1, without substantially reducing the cross-sectional area of the flow passage 52. The force required to bend the teat cup assembly 10 relative to the milking tube section 38 is relatively low, so the side forces exerted on the cow's teat after installation are minimal. As a result, the teat cup assembly 10 hangs comfortably from the cow's teat and distortion of the mouthpiece opening 36 is minimized.

A second circumferentially extending groove 72 in exterior wall 61 of the stem portion 46 at a location axially spaced from the first groove 60 toward the lower end 56 of the stem portion 46 serves two functions. It cooperates with the first groove 60 to share the deflection stresses applied on the stem portion 46 when the teat cup assembly 10 is bent relative to the stem portion 46 for installation on a cow's teat and thereby further reduces the side forces applied on a cow's teat. Both the first and second grooves 60 and 72 preferably extend around the entire circumference of the stem portion 46 so that this bending action can take place in any radial direction throughout 360°. Thus, the first and second grooves 60 and 72 function somewhat like swivel joints.

The second groove 72 also is arranged to permit the teat cup assembly 10 to be folded over toward the stem portion 46 so that opposed portions of the inner wall 50 in the vicinity of the second groove 72 are crimped together to shut off the flow passage 52. Without the second groove 72, the lower end 22 of the shell 12 would wedge against the exterior wall 61 of the stem portion 46 before there is sufficient kinking to crimp the flow passage shut and the teat cup assembly 10 would unfold when released. Thus, the second groove 72 is located far enough away from the first groove 60 so that the teat cup assembly 10 can be bent relative to the stem portion 46 to the folded over position illustrated in FIG. 2 before any part of the shell 12 and any part mounted on the shell 12 engages the exterior wall 61 of the stem portion 46. The second groove 72 usually permits sufficient kinking for the weight of the teat cup assembly 10 to retain it in a folded position.

When a cow has a missing teat or a malformed, injured or diseased teat not to be milked, the operator can prevent the loss of vacuum through the unused teat cup assembly by simply folding it over and placing it across the top of the milker claw 16 as described above.

As best shown in FIG. 5, the second groove 72 does not necessarily have to be as deep as the first groove 60. As a guide, the wall thickness of the stem portion 46 at the bottommost portion 74 of the second groove 72 can be about 55% to about 70% of the wall thickness of the stem portion 46 adjacent the second groove 72 and the longitudinal distance between the bottommost portion 62 of the first groove 60 and the bottommost portion 74 of the second groove 72 (designated by the letter B in FIG. 5) can be about 1 to about 1¼ inches.

FIG. 6 illustrates a three-piece type milking inflation 76 including a separate suction sleeve or barrel section part 78 (illustrated fragmentarily) having a lower end 80 which fits inside an opening 82 in the lower end of the shell 84. The inflation 76 also includes a separate milking tube part 86, an elongated stem portion 46a similar to stem portion 46 described above and a reinforcement section 58a similar to reinforcement section 58 described above. The inflation 76 further includes a sleeve connector 88 having an enlarged upper end portion 90 which fits inside the lower end 80 of the barrel section part 78 and presses the outer wall of the lower end 80 into sealing engagements with the shell opening 82. The sleeve connector 88 has a reduced lower end 91 which receives the upper end 92 of the milking tube part 86.

The stem portion 46a of the milking tube part 86 includes first and second circumferentially extending, axially spaced groove 60a and second groove 72a which are arranged and function in substantially the same manner as grooves 60 and 72 described above. In the specific construction illustrated in FIG. 6, the first groove 60a is located in a region adjacent the lowermost end 91 of the sleeve connector 88 which provides internal support for resisting crimping like the retaining portion 42 in the embodiment described above. The second groove 72a is located far enough away from the lower end of the shell 84 to permit the teat cup assembly 10a to be folded over toward the stem portion 46b to a folded over position where the flow passage 52a is crimped shut in the vicinity of the second groove 72b as described above before the shell 84 engages the stem portion 46a.

FIG. 7 illustrates a two-piece type milking inflation 98 including a separate suction sleeve or barrel section part 100 (illustrated fragmentarily) which fits inside a shell 102 and has a lower end portion 104 which extends through the open lower end 106 of the shell 102 and is folded back over the outer surface of the lower end of the shell 102. The inflation 98 also includes a separate milking tube part 110 having a stem portion 46b similar to stem portion 46 described above and a reinforcement section 58b similar to reinforcement section 58 described above. The milking tube part 110 has an enlarged, cup-shaped portion 112 connected to the upper end 114 of the stem portion 46a which fits over and sealingly engages the folded over portion 104 of the barrel section part 100.

The stem portion 46b includes first and second circumferentially, axially spaced grooves 60b and 72b which are arranged and function in substantially the same manner as grooves 60 and 72 described above. In the specific construction illustrated in FIG. 7, the first groove 60b is near the juncture between the thicker cup-shaped portion 112 and the upper end 114 of the stem portion 46b. The second groove 72b is located far enough away from the outermost edge 116 of the cup-shaped portion 112 to permit the teat cup assembly 10b to be folded over toward the stem portion 46b to a folded over position where the flow passage 52b is crimped shut in the vicinity of the second groove 72b as described above before the edge 116 engages the stem portion 46b.

From the foregoing description, one skilled in the art can easily ascertain the essential characteristics of the invention and, without departing from the spirit and scope thereof, make various changes and modifications to adapt the two various usages.

We claim:

1. A milking inflation for use with a teat cup assembly including a rigid shell having a lower end, said inflation being made from an elastomeric material and having a tubular milking tube section extendable from the lower end of the shell, said milking tube section including an elongated stem portion having an exterior wall including an outer surface, upper and lower end portions and an inner wall defining a flow passage therethrough;

a circumferentially-extending first groove in the outer surface of said exterior wall of said stem portion at a location below and spaced from the lower end of the shell and adjacent a thicker part or an internally supported part of said stem portion, said first groove being arranged to permit substantial angular bending of said teat cup assembly relative to said stem portion for attachment to a cow's teat without substantial crimping which causes a reduction in the cross-sectional area of said flow passage; and a second circumferentially-extending groove in the outer surface of said exterior wall of said stem portion axially spaced from said first groove in a direction toward said lower end portion and being arranged to cooperate with said first groove to permit the teat cup assembly to be folded over toward said stem portion to a folded over position where said stem portion is sufficiently crimped in the vicinity of said second groove to substantially close said flow passage and where the teat cup assembly can be laid on a generally horizontal support surface and remain in a folded over position.

2. A milking inflation according to claim 1 wherein when said inflation is installed in a shell, said second groove is located far enough away from the lower end of the shell to permit the teat cup assembly to be moved to the folded over position before the shell or any part carried by said shell engages said stem portion.

3. A milking inflation according to claim 2 wherein said first and second grooves each have a bottommost part; and the thickness of said stem portion at the bottommost part of said first groove is about 50% to about 65% of the thickness between said inner and exterior walls of said stem portion adjacent said first groove and at the bottommost part of said second groove is about 55% to about 70% of the thickness between said inner and exterior wall of said stem portion adjacent said second groove.

4. A milking inflation according to claim 2 wherein the bottommost part of said second groove is located about 1 to about 1¼ inches from the bottommost part of said first groove.

5. A milking inflation according to claim 2 wherein said inflation is a one-piece unit including a shell section extending from said milking tube section and adapted to fit inside the shell;

said milking tube section includes an externally enlarged retaining portion between said shell section and the upper end of said stem portion said retaining portion being located adjacent the lower end of the shell when said inflation is installed in the shell; and said first groove is located at the juncture between said retaining portion and the upper end of said stem portion.

6. A milking inflation according to claim 2 wherein said inflation is a multiple-piece unit including a separate shell section adapted to fit inside the shell and having a lower end portion which is adapted to extend through an opening in the lower end of the shell and to be folded back over the outer surface of the shell;

said milking tube section is a separate part and includes a cup-shaped upper end portion extending from the upper end of said stem portion and adapted to fit over said folded back portion; and said first groove is located adjacent the juncture between the upper end of said stem portion and said cup-shaped upper end portion.

7. A milking inflation according to claim 2 wherein said inflation is a multi-piece unit including a separate shell section adapted to fit inside the shell and having a lower end portion which is adapted to extend through an opening in the lower end of the shell and further including a sleeve connector having an upper end adapted to fit inside said shell lower end portion and press the outer surface thereof into sealing engagement with the shell opening and a lower end adapted to receive the upper end of said stem portion of said milking tube section;

said milking tube section is a separate part; and said groove is located below and adjacent the lower end of said connector.

8. A milking inflation for use with a teat cup assembly including a rigid shell having a lower end, said inflation being made from an elastomeric material and having a tubular milking tube section extendable from the lower end of the shell, said milking tube section including an elongated stem portion having an exterior wall including an outer surface, upper and lower end portions and an inner wall defining a flow passage therethrough;

a circumferentially-extending first groove in the outer surface of said exterior wall of said stem portion at a location below and spaced from the lower end of the shell, when said inflation is installed in the shell and adjacent a thicker part or an internally supported part of said stem portion, said first groove being arranged to permit substantial angular bending of said teat cup assembly relative to said stem portion for attachment to a cow's teat without substantial crimping which causes a reduction in the cross-sectional area of said flow passage; and a second circumferentially extending groove in the outer surface of said exterior wall of said stem portion axially spaced from said first groove in a direction toward said lower end portion and being arranged to cooperate with said first groove to permit the teat cup assembly to be folded over toward said stem portion to a folded over position where said stem portion is sufficiently crimped in the vicinity of said second groove to substantially close said flow passage and where the teat cup assembly can be laid on a generally horizontal support surface and remain in a folded over position such that, when said inflation is installed in the shell, said second groove is located far enough away from the lower end of the shell to permit the teat cup assembly to be moved to the folded over position before the shell or any part carried by said shell engages said stem portion.

9. A milking inflation according to claim 8 wherein the bottommost part of said second groove is located about 1 to about 1¼ inches from the bottommost part of said first groove.

10. A milking inflation according to claim 9 wherein said first and second grooves each has a bottommost part; and the thickness of said stem portion at the bottommost part of said first groove is about 50% to about 65% of the thickness between said inner and exterior walls of said stem portion adjacent said first groove and at the bottommost part of said second groove is about 55% to about 70% of the thickness between said inner and exterior walls of said stem portion adjacent said second groove.

* * * * *